United States Patent
Smith

(10) Patent No.: US 9,898,060 B2
(45) Date of Patent: Feb. 20, 2018

(54) SYSTEM AND METHOD FOR WIRELESS POWER TRANSFER USING AUTOMATIC POWER SUPPLY SELECTION

(71) Applicant: Integrated Device Technology, Inc., San Jose, CA (US)

(72) Inventor: Nicholaus W. Smith, Duluth, GA (US)

(73) Assignee: INTEGRATED DEVICE TECHNOLOGY, INC., San Jose, CA (US)

( * ) Notice: Subject to any disclaimer, the term of this patent is extended or adjusted under 35 U.S.C. 154(b) by 15 days.

(21) Appl. No.: 14/752,719

(22) Filed: Jun. 26, 2015

(65) Prior Publication Data

US 2016/0077562 A1 Mar. 17, 2016

Related U.S. Application Data

(60) Provisional application No. 62/051,243, filed on Sep. 16, 2014.

(51) Int. Cl.
    *G06F 1/26* (2006.01)
    *H02J 1/10* (2006.01)

(52) U.S. Cl.
    CPC ............ *G06F 1/266* (2013.01); *G06F 1/263* (2013.01); *H02J 1/10* (2013.01)

(58) Field of Classification Search
    CPC ............ G06F 1/263; G06F 1/266; H02J 1/10
    See application file for complete search history.

(56) References Cited

U.S. PATENT DOCUMENTS

| | | | | |
|---|---|---|---|---|
| 2011/0202777 A1* | 8/2011 | Hijazi | ............ | G06F 1/263 713/300 |
| 2012/0044231 A1* | 2/2012 | Park | ............ | G06F 1/263 345/211 |
| 2013/0076155 A1* | 3/2013 | Yu | ............ | H02J 9/061 307/104 |
| 2014/0084706 A1* | 3/2014 | Sun | ............ | G06F 1/263 307/113 |
| 2014/0285141 A1* | 9/2014 | Lee | ............ | H02J 7/025 320/108 |
| 2015/0011160 A1* | 1/2015 | Jurgovan | ............ | H04B 5/0031 455/41.1 |

* cited by examiner

*Primary Examiner* — Terrell Johnson
(74) *Attorney, Agent, or Firm* — Haynes and Boone, LLP

(57) ABSTRACT

A system and method of wireless power transfer using automatic power supply selection includes an electronic system. The electronic system includes an electronics module, a primary power supply that receives power from a primary external power source, a secondary power supply that receives power from a secondary external power source, and a selection module. When the primary power supply is operative, the selection module selects the primary power supply to supply power to the electronics module and disables the secondary power supply. When the primary power supply is not operative and the secondary power supply is operative, the selection module selects the secondary power supply to supply power to the electronics module. When the secondary power supply is disabled, the secondary power supply disables the secondary external power source.

10 Claims, 5 Drawing Sheets

SYSTEM AND METHOD FOR WIRELESS POWER TRANSFER USING AUTOMATIC POWER SUPPLY SELECTION

RELATED APPLICATIONS

The present application claims priority to U.S. Provisional Application Ser. No. 62/051,243, filed on Sep. 16, 2014, which is herein incorporated by reference in its entirety.

TECHNICAL FIELD

The present disclosure relates generally to wireless power transfer and more particularly to wireless power transfer using automatic power supply selection.

BACKGROUND

Wireless power transfer offers a convenient technique for conveying electrical power without the use of traditional electrical cords. Among other advantages, wireless power transfer reduces safety hazards associated with cords, such as tripping and fire hazards, and improves aesthetics by reducing cord clutter. Still further, wireless power transfer is a low-hassle and cost-effective alternative to wired charging for portable electronics. For example, for portable electronics that are charged daily, wireless power transfer reduces the likelihood of misplacing wired chargers and prevents wear-and-tear associated with repeatedly plugging and unplugging the devices.

Accordingly, it would be desirable to provide improved wireless power transfer systems.

SUMMARY

Consistent with some embodiments an electronic system includes an electronics module, a primary power supply that receives power from a primary external power source and supplies the received power to the electronics module when operative, a secondary power supply that receives power from a secondary external power source and supplies the received power to the electronics module when operative, and a selection module having first and second input rails coupled to the primary and secondary power supplies, respectively, and an output rail coupled to the electronics module. When the primary power supply is operative, the selection module selects the primary power supply to supply power to the electronics module and disables the secondary power supply. When the primary power supply is not operative and the secondary power supply is operative, the selection module selects the secondary power supply to supply power to the electronics module. When the secondary power supply is disabled, the secondary power supply disables the secondary external power source.

Consistent with some embodiments, a power supply selection circuit includes a first switch coupled between a first input node and an output node, a second switch coupled between a second input node and the output node, a first control subcircuit coupled between the first input node and the second switch, and a second control subcircuit coupled between the second input node and first switch. The first input node carries a first input voltage and the second input node carries a second input voltage. The first control subcircuit is configured to apply a first control voltage to the second switch and an enable/disable voltage, each voltage being based on the first input voltage. The second control subcircuit is configured to apply a third control voltage to the first switch based on the second input voltage.

Consistent with some embodiments, a method includes conducting power from a wireless power receiver to a system power supply rail through a closed first switch and detecting a turn-on of a wired power receiver. After detecting the turn-on of the wired power receiver, the method includes opening the first switch, disabling the wireless power receiver, closing a second switch, and conducting power from the wired power supply to the system power supply rail through the closed second switch. Disabling the wireless power receiver includes disabling a wireless power transmitter engaged with the wireless power receiver

In the figures, elements having the same designations have the same or similar functions.

DETAILED DESCRIPTION

In the following description, specific details are set forth describing some embodiments consistent with the present disclosure. It will be apparent to one skilled in the art, however, that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

The benefits of wireless power transfer, discussed previously, may be enhanced when a device that includes a wireless power receiver additionally includes one or more conventional wired power supplies. Such a device may allow a user to flexibly power the device using any of a variety of external power sources depending on which of the sources are available at a given time. For example, a device may initially use wireless power when it is set down on a charging pad, but after the user then plugs in a cord to the device, such as universal serial bus (USB) cable, it may be preferable to use the available USB power for reasons such as increased energy efficiency. In another example, a user of a device such as an electric car may benefit from the convenience of wireless charging in some situations but may benefit from the rapid charging capabilities of a wired power supply in other situations. However, despite the many benefits of being able to select between multiple power sources, conventional wireless power receivers and associated components may not provide simple, efficient, and/or convenient techniques for switching between wired and wireless power supplies.

Figure 1:
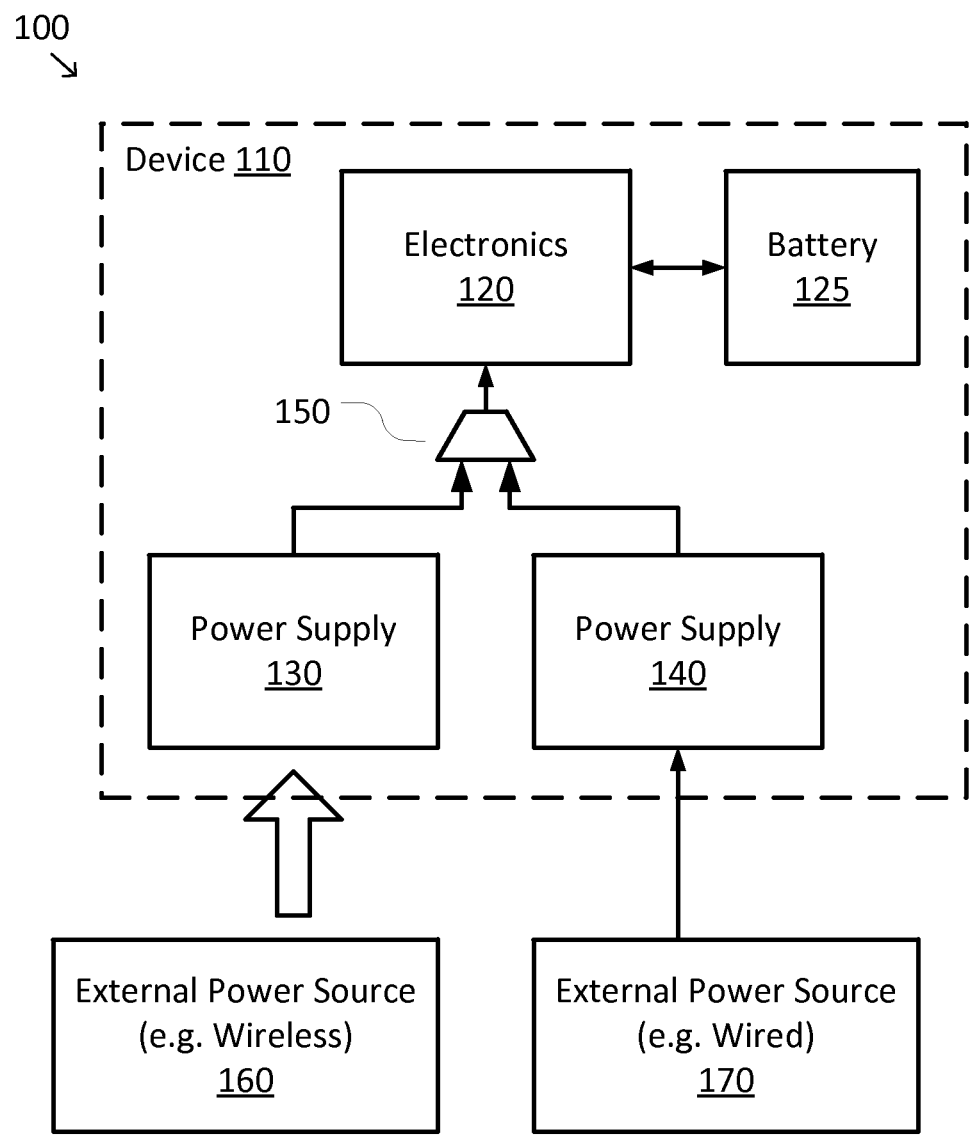
FIG. 1 is a simplified diagram of an electronic system configured for automatic power supply selection according to some embodiments.

FIG. 1 is a simplified diagram of an electronic system 100 configured for automatic power supply selection according to some embodiments. Electronic system includes an electronic device 110. Electronic device 110 may be virtually any electronic device, such as a desktop or portable computer, a mobile computing device such as a smart phone or watch, a remote control, an electric and/or hybrid electric vehicle, and/or the like. Electronic device 110 may include one or more electronics modules 120 that serve as a load of the electronic system 100. Electronics module 120 may include any electronic component of the above mentioned electronic devices such as an integrated circuit, a display, an actuator, a sensor, a signal processor circuit, and/or the like and/or a combination thereof. In some examples, electronics module 120 may be coupled to a battery 125. Battery 125 serves as a load of electronic system 100 when charging and as a source of power when discharging. According to some examples, battery 125 may be charged when electronics module 120 is receiving power from an external power source and may be discharged when no external power source is available. Battery 125 may include any suitable energy storage device such as, without limitation, a lithium ion battery, a capacitor, a supercapacitor and/or the like.

Electronic device 110 may receive power using power supplies 130 and 140. According to some embodiments, power supply 130 may be configured as a wireless power receiver and power supply 140 may be configured as a wired power supply. Selection module 150 receives power from one or both of power supplies 130 and 140 and delivers the received power from one of power supplies 130 and 140 to electronics module 120. Selection module 150 selects one of power supplies 130 and 140 to supply power to electronics module 120 at a given time. Selection module 150 may further apply enable/disable signals (not shown) to one or both of power supplies 130 and 140 to disable a power supply that is not being used at a given time.

Power supplies 130 and 140 receive power from respective external power sources 160 and 170. When power supply 130 is configured as a wireless power receiver, corresponding external power source 160 is configured as a wireless power transmitter. According to some examples, electromagnetic fields may be used to transmit power from external power source 160 to power supply 130. In some embodiments, when the electromagnetic fields include time-varying magnetic fields, external power source 160 may be coupled to power supply 130 using inductive, near-field, and/or resonant power transfer coupling mechanisms and/or the like. In furtherance of such embodiments, external power source 160 and power supply 130 may include inductive coils for wireless power transfer. In addition to transporting electrical power, the electromagnetic fields may also be used to communicate data between electronic device 110 and external power source 160. When power supply 140 is configured as a wired power supply, corresponding external power source 170 is configured to provide power over a wire. The wire may include any suitable conductor, such as a USB cable, an Ethernet cable, a dock connector, an alternating current power cord, a laptop charging cable, and/or the like. In addition to transporting electrical power, the cable may also be used to communicate data between electronic device 110 and external power source 170.

According to some embodiments, disabling a power supply, such as power supply 130, may include disabling the transmission of power from the corresponding external power source, such as external power source 160. Accordingly, when power supply 130 and external power source 160 are a wireless power transmitter and receiver pair, disabling power supply 130 may include disabling the transmission of power from external power source 160, including at least attenuating the electromagnetic fields generated by external power source 160 to transmit power. Disabling the transmission of power from external power source 160 may be accomplished by sending a signal and/or a message from power supply 130 to external power source 160 to disable the wireless power transfer. The signal and/or message may be transmitted using any suitable communication mechanism, such as wireless power communication protocols, Bluetooth communication, and/or the like.

Figure 2:
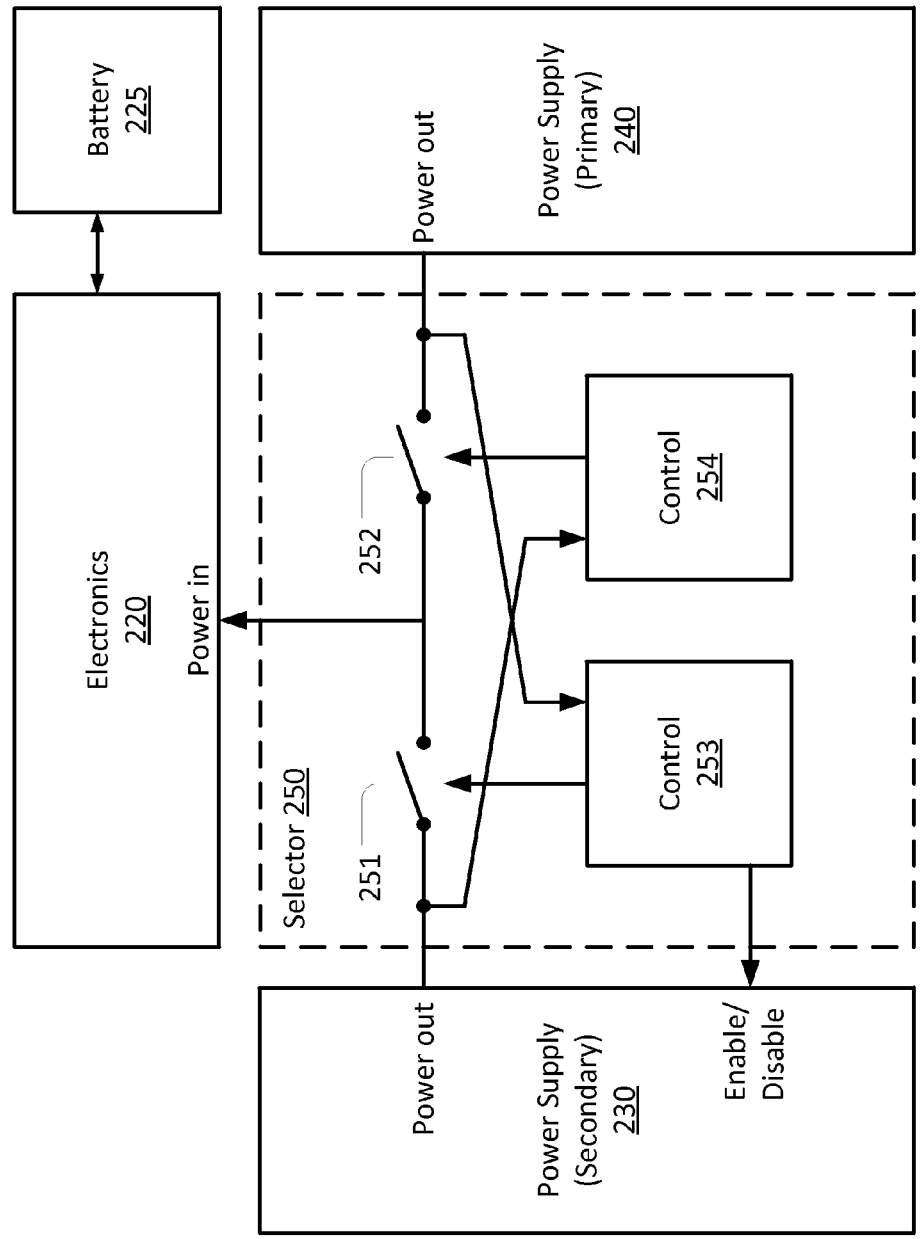
FIG. 2 is a simplified diagram of an electronic device configured for automatic power supply selection according to some embodiments.

FIG. 2 is a simplified diagram of an electronic device 200 configured for automatic power supply selection according to some embodiments. According to some embodiments consistent with FIG. 1, electronic device 200 may be used to implement at least some portions of electronic system 100. Like electronic device 110, electronic device 200 includes an electronics module 220 coupled to a battery 225. Electronic device 200 further includes power supplies 230 and 240 coupled through selection module 250 to electronics module 220. These components generally correspond to similar components described above with respect to FIG. 1. As depicted in FIG. 2, power supply 240 is identified as a primary power supply and power supply 230 is identified as a secondary power supply. Selection module 250 includes a pair of input rails configured to receive power from the respective 'power out' pins of power supplies 230 and 240 and an output rail configured to deliver power to the 'power in' pin of electronics module 220. Selection module also includes an enable/disable rail configured to deliver a control signal to the 'enable/disable' pin of power supply 230.

Selection module 250 includes a pair of switches 251 and 252 and a pair of control modules 253 and 254. Control module 253 is configured to determine whether primary power supply 240 is operative and, based on this determination, apply a control signal to switch 251. Similarly, control module 254 is configured to determine whether secondary power supply 230 is operative and, based on this determination, apply a corresponding control signal to switch 252. Power supplies 230 and 240 are operative when they are engaged with an external power source (e.g., plugged in and/or wirelessly coupled to the external power source), enabled, and/or otherwise capable of delivering power to electronics module 220. According to some embodiments, to detect whether the corresponding power supply is operative, each control module may be coupled to the corresponding input rail in order to detect the output of the power supply.

The control signals applied by control modules 253 and 254 are configured to open and close switches 251 and 252. In particular, control module 253 is configured to open switch 251 when primary power supply 240 is operative and close switch 251 when primary power supply 240 is inoperative. Control module 254 is configured to open switch 252 when secondary power supply 230 is operative and close switch 252 when secondary power supply 230 is inoperative. By opening switches 251 and 252 when the corresponding power supply 230 or 240 is inoperative, control module 254 substantially reduces and/or blocks the flow of power (e.g. reverse leakage current) from the output rail into the corresponding power supply through the respective input rail. Such reverse leakage current is undesirable as it may dissipate excessive energy, damage the power supplies, and/or the like.

Control module 253 is additionally configured to apply an enable/disable control signal to secondary power supply 230. Based on the enable/disable signal, secondary power supply 230 may be enabled and disabled by control module 253. When secondary power supply 230 is disabled, secondary power supply 230 becomes inoperative even when engaged with an external power source. Control module 253 is configured to disable secondary power supply 230 when primary power supply 240 is operative, thereby preventing both power supplies from being operative at the same time. According to some embodiments, secondary power supply 230 may include a wireless power receiver engaged with an external wireless power transmitter. In such embodiments, disabling a secondary power supply 230 may include disabling the transmission of power from the wireless power transmitter. Disabling wireless power transmission may result in a reduction of energy dissipation associated with the generation of electromagnetic fields by the wireless transmitter while the primary power supply is operative. Disabling the transmission of power from the wireless power transmitter may be accomplished by sending a signal and/or a message from power supply 230 to external wireless power transmitter to disable the wireless power transfer. The signal and/or message may be transmitted using any suitable communication mechanism, such as wireless power communication protocols, Bluetooth communication, and/or the like.

Figure 3:
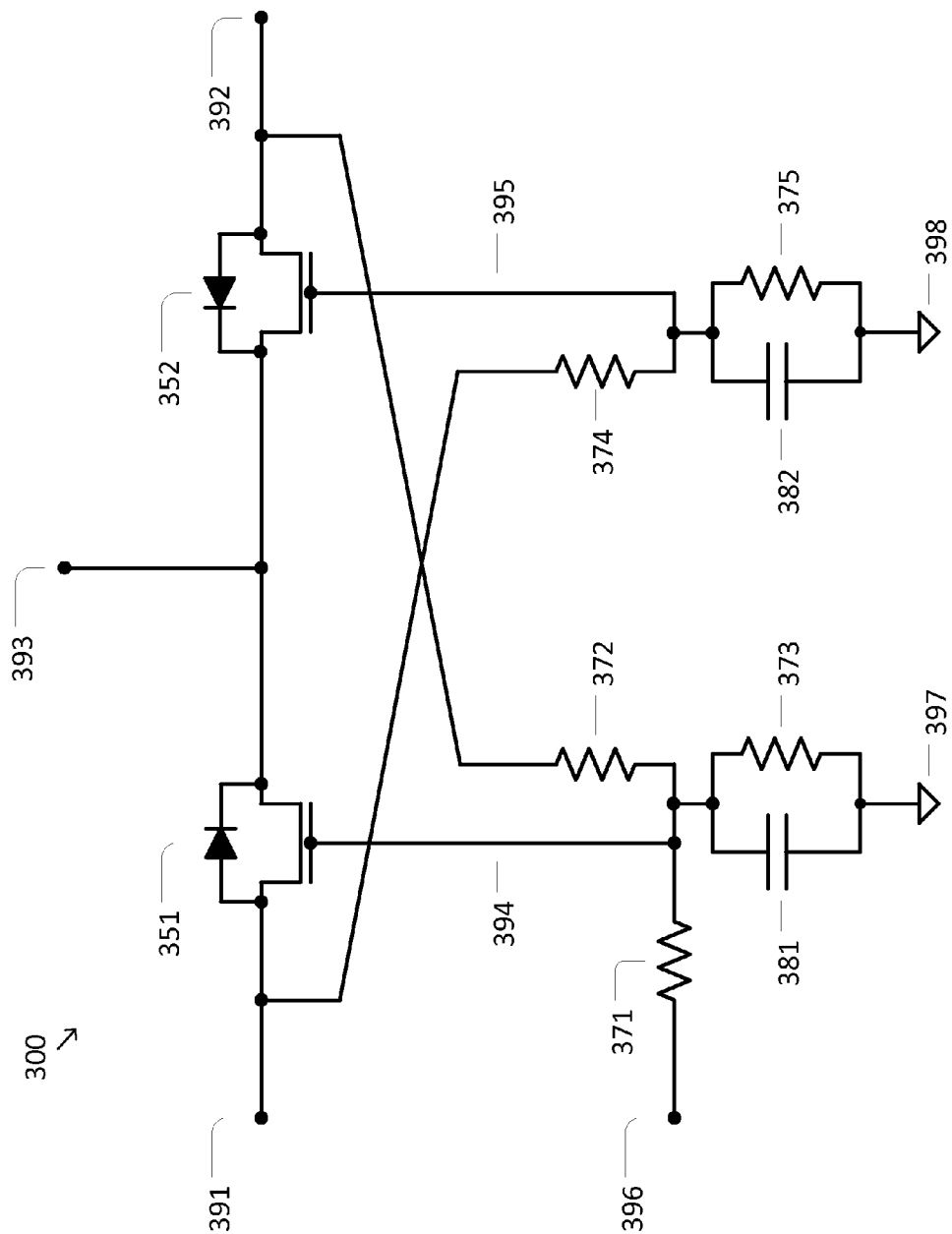
FIG. 3 is a simplified diagram of a selection circuit configured for automatic power supply selection according to some embodiments.

FIG. 3 is a simplified diagram of a selection circuit 300 configured for automatic power supply selection according to some embodiments. According to some embodiments consistent with FIGS. 1 and 2, selection circuit 300 may be used to implement at least some portions of electronic system 100 and/or electronic device 200. Like selection module 250, selection circuit 300 includes a pair of switches 351 and 352. Selection circuit 300 additionally includes control subcircuits that include resistors 371-375 and capacitors 381 and 382. Nodes 391-398 couple the circuit elements of selection circuit 300 as depicted in FIG. 3. Nodes 391 and 392 are input nodes, node 393 is an output node, nodes 394 and 395 are internal control nodes, node 396 is an enable/disable node, and nodes 397 and 398 are ground nodes. According to some embodiments consistent with FIGS. 1 and 2, input nodes 391 and 392 may couple to 'power out' pins of a pair of power supplies, such as power supplies 230 and 240, output node 393 may couple to an electronic load, such as electronics module 240, and enable/disable node 396 may couple to an 'enable/disable' pin of a secondary power supply, such as power supply 230.

A first control subcircuit of selection circuit 300 includes resistors 371-373 and capacitor 381. Resistor 372 is coupled between input node 392 and control node 394. Resistor 373 is coupled between control node 394 and ground node 397. Together, resistors 372 and 373 form a voltage divider, wherein the voltage at node 394 is a predetermined fraction of the voltage at input node 392. According to some embodiments, the voltage divider formed by resistors 372 and 373 may be configured such that the resistance of resistor 373 is approximately 10 times greater than the resistance of resistor 372. For example, resistor 372 may be a 10 kΩ resistor and resistor 373 may be a 100 kΩ resistor. The voltage divider may further include capacitor 381 arranged in parallel with resistor 373. In some embodiments, capacitor 381 may provide a desired transient response and/or time delay associated with control node 394 in response to changes in the voltage at input node 392. For example, increasing the transient response time of control node 394 may prevent undesired rapid voltage fluctuations at nodes 391 and/or 393 in response to a change in voltage at node 392. According to some embodiments, capacitor 381 may be a 1 nF capacitor. The first control subcircuit of selection circuit 300 may further include resistor 371 coupled between control node 394 and enable/disable node 396. According to some examples, the resistance of resistor 371 may be selected as any value from 0 to 1 MΩ depending, for example, on the circuitry of the secondary power supply associated with the 'enable/disable' pin. In some examples, resistor 371 may be a 100 kΩ resistor.

A second control subcircuit of selection circuit 300 includes resistors 374 and 375 and capacitor 382. Resistor 374 is coupled between input node 391 and control node 395. Resistor 375 is coupled between control node 395 and ground node 398. Together, resistors 374 and 375 form a voltage divider, wherein the voltage at node 395 is a predetermined fraction of the voltage at input node 391. According to some embodiments, the voltage divider formed by resistors 374 and 375 may be configured such that the resistance of resistor 375 is approximately 10 times greater than the resistance of resistor 374. For example, resistor 374 may be a 10 kΩ resistor and resistor 375 may be a 100 kΩ resistor. The voltage divider may further include capacitor 382 arranged in parallel with resistor 375. In some embodiments, capacitor 382 may provide a desired transient response and/or time delay associated with control node 395 in response to changes in the voltage at input node 391. For example, increasing the transient response time of control node 395 may prevent undesired rapid voltage fluctuations at node 392 in response to a change in voltage at node 391. According to some embodiments, capacitor 382 may be a 47 nF capacitor. According to some embodiments, capacitor 382 may have a capacitance equal to or greater than capacitor 381.

In some examples, switches 351 and 352 may include field effect transistors (FETs), each FET having a gate, source and drain. The FETs may further be associated with body diodes oriented such that they permit electrical current to flow from input nodes 391 and/or 392 towards output node 393. The FETs are turned on and off by gate voltages carried by control nodes 394 and 395 applied to their gates. In some examples, the FETs may be p-channel FETs (PFETs) having their sources coupled to output node 393 and their drains coupled to input nodes 391 and/or 392. The PFETs are turned on (i.e., electrically conductive between source and drain) when their gate voltage is lower than their source voltage by at least a threshold voltage, otherwise, they are turned off (i.e., non-conductive between source and drain).

According to some examples, when the primary power supply is operative, a high voltage may be applied to enable/disable node 396 and to the 'enable/disable' pin of the secondary power supply. According to some embodiments, the secondary power supply may include a wireless power receiver engaged with an external wireless power transmitter. In such embodiments, applying the high voltage to the 'enable/disable' pin of the secondary power supply may result in the wireless power receiver disabling the transmission of power from the wireless power transmitter. Disabling wireless power transmission may result in a reduction of energy dissipation associated with the generation of electromagnetic fields by the wireless transmitter while the primary power supply is operative. Disabling the transmission of power from the wireless power transmitter may be accomplished by sending a signal and/or a message from the secondary power supply to external wireless power transmitter to disable the wireless power transfer. The signal and/or message may be transmitted using any suitable communication mechanism, such as wireless power communication protocols, Bluetooth communication, and/or the like.

As discussed above and further emphasized here, FIGS. 1-3 are merely examples which should not unduly limit the scope of the claims. One of ordinary skill in the art would recognize many variations, alternatives, and modifications. According to some embodiments, various components of electronic device 200 may be added, removed, modified and/or rearranged. Although the primary power supply is described as corresponding to a wired power supply and the secondary power supply is described as corresponding to a wireless power supply, other configurations may be used. According to some embodiments, the primary and secondary power supplies may both be wired power supplies. According to some embodiments, the primary and secondary power supplies may both be wireless power supplies. According to some embodiments, the primary power supply may be wireless and the secondary power supply may be wired. According to some examples, control modules 253 and/or 254 may be combined into a single module and/or subdivided into more than two modules, each module including control circuits having greater and/or less complexity (e.g. having more or fewer components and/or nodes) than the circuits depicted in FIG. 3. According to some examples, at least a portion of control modules 253 and/or 254 may be implemented using a microprocessor, digital logic (e.g. a state machine), analog logic (e.g. a comparator), and/or the like. According to some examples, additional links between the various modules 220-250 may be provided, for example, to conduct additional power and/or control information between the modules. For example, to detect whether a power supply is operative, each control module may receive a control signal from a designated signaling pin of the power supply that indicates whether or not the power supply is operative. This control signal may be used instead of, and/or in addition to, detecting the output of the 'power out' pin to determine whether the power supply is operative. According to some examples, electronics module 220 may include one or more wireless power repeaters for wirelessly transferring the at least a portion of the power received from the power supplies to a different electronic device.

According to some embodiments, various components depicted in selection circuit 300 may be added, removed, modified and/or rearranged. In some examples, capacitor 381 and/or capacitor 382 may be removed. In some examples, one or more resistors, such as resistors 371, 372, and/or 374 may be replaced by short circuits, and/or one or more resistors, such as resistors 373 and/or 375 may be replaced by open circuits. In some examples, ground nodes 397 and/or 398 may be coupled to a rail other than a ground rail, such as a supply rail. According to some embodiments, switches 351 and/or 352 may include n-type FETs (NFETs) rather than, and/or in addition to, PFETs. In furtherance of such embodiments, other portions of selection circuit 300 may be modified and/or rearranged accordingly to accommodate the electrical characteristics of the NFETs. Such modifications may include configuring the body diodes associated with the NFETs to have the same orientation as the body diodes associated with the PFETs as depicted in FIG. 3 and/or adding a voltage boosting circuit, higher voltage source and/or the like to provide a control voltage at the gate of the NFET that is greater than the source voltage of the NFET by at least a threshold voltage when the NFET is turned on. According to some embodiments, NFETs may be used in embodiments of selection circuit 300 that include more advanced control circuitry than depicted in FIG. 3. Although switches 251, 252, 351, and 352 are depicted as being switched between discrete conductive and non-conductive states, in some embodiments one or more of the switches may be operated in intermediate states, such as a linear region of operation between the conductive and non-conductive states.

Figure 4:
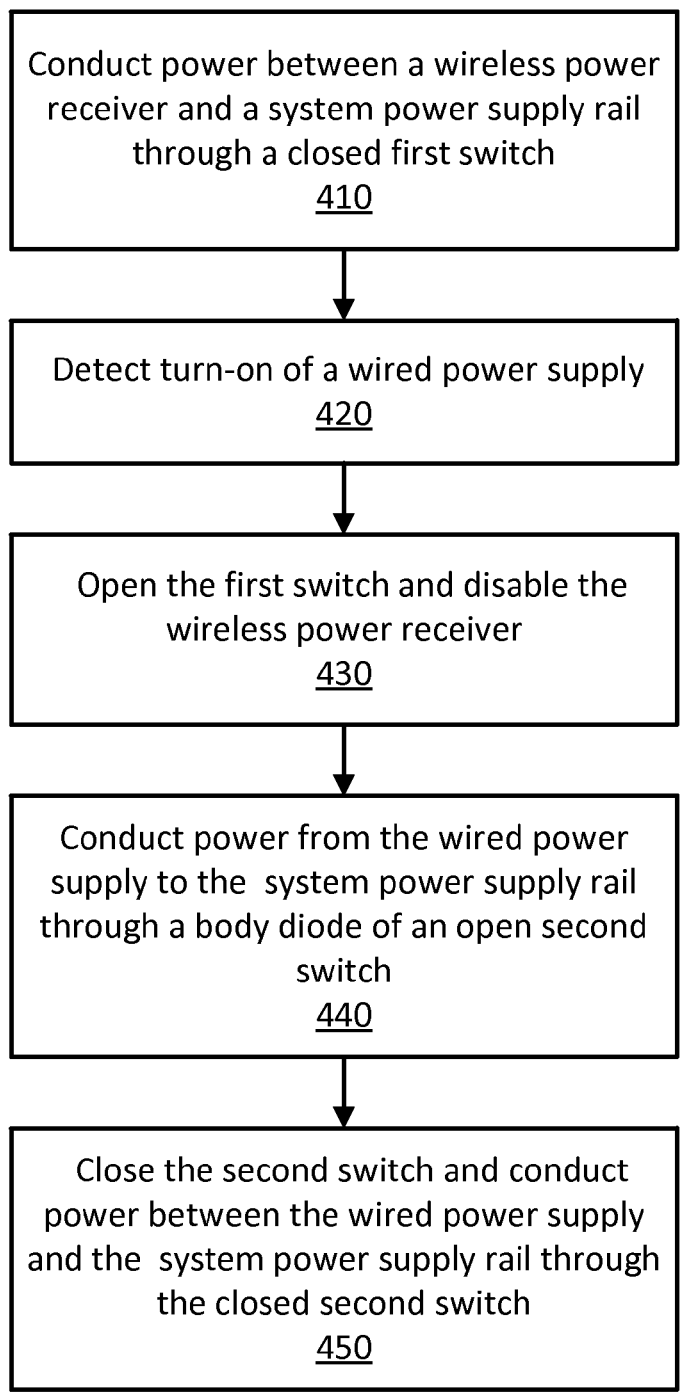
FIG. 4 is a simplified diagram of a method of automatically switching from a wireless power supply to a wired power supply according to some embodiments.

FIG. 4 is a simplified diagram of a method 400 of automatically switching from a wireless power supply to a wired power supply according to some embodiments. According to some embodiments consistent with FIGS. 1-3, method 400 may be performed by an electronic system configured for automatic power supply selection, such as electronic system 100, an electronic device configured for automatic power supply selection, such as electronic device 200, and/or a selection circuit configured for automatic power supply selection, such as selection circuit 300.

According to some embodiments, method 400 may be performed when a user plugs an electronic device that is currently receiving wireless power into a wired external power source. According to some embodiments consistent with FIGS. 1-3, the electronic device may be an instance of electronic device 110. The electronic device may include a wireless power receiver, such as power supply 130 configured as a wireless power receiver, and a wired power supply, such as power supply 140 configured as a wired power supply. The wireless power receiver may be engaged with an external wireless power transmitter, such as external power source 160 configured as a wireless power transmitter. Plugging in the electronic device may involve electrically coupling the wired power supply with an external wired power source, such as external power source 170 configured as a wired power source.

At a process 410, electrical power is conducted between the wireless power receiver and a system power supply rail through a closed first switch. In some embodiments consistent with FIGS. 1-3, the wireless power receiver may serve as a secondary power supply for an electronics module. The first switch may be an instance of switch 251 and/or 351. In some examples, the wireless power receiver may be coupled to a wireless power transmitter during process 410, the wireless power transmitter serving as an external source of the power received by the wireless power receiver. According to some embodiments, the first switch may include a PFET. The PFET may be held in a conductive state during process 410 by applying a gate voltage to the PFET that is lower than the voltage of the system voltage rail by at least a threshold voltage of the PFET.

At a process 420, a turn-on of the wired power supply is detected. In some examples, the wired power supply may be turned on by being plugged into the external power source and/or by being switched on (manually or otherwise). The wired power supply becomes operative (i.e., capable of supplying power to the electronics module) when it is turned on. In some embodiments consistent with FIGS. 1-3, the wired power supply may serve as a primary power supply for the electronics module. According to some embodiments, when the wired power supply is turned on, it may generate an electrical signal, such as a voltage signal, that indicates that it is operative. In some examples, the voltage signal may include a transition from a low voltage level to a high voltage level at an output power rail of the wired power supply. According to some embodiments, the voltage signal may be applied across a resistor, capacitor, voltage divider, and/or any other suitable circuit element, thereby allowing the turn-on of the wired power supply to be detected.

At a process 430, the first switch is opened and the wireless power receiver is disabled. When the wireless power receiver is disabled, it is no longer operative to supply power to the electronics module, even when it remains coupled to a wireless power transmitter. According to some embodiments, the wireless power receiver is disabled when the wired power supply is operative to prevent more than one power supply from delivering power to the system power supply rail at a given time. In some examples, the first switch may be opened and/or the wireless power receiver may be disabled based on an electrical signal, such as a voltage signal, sent to the switch and/or to the wireless power receiver. In some examples, the voltage signal may include a transition from a low voltage level to a high voltage level. In some embodiments, the high voltage level may be a predetermined fraction of the high voltage level of the output power rail of the wired power supply. In some embodiments, the predetermined fraction may be approximately 9/10. As discussed previously with respect to process 410, the first switch may include a PFET. The voltage signal may result in the PFET being switched to a non-conductive state by applying a high gate voltage to the PFET, the high gate voltage being within the threshold voltage of the voltage of the system voltage rail. Opening the first switch may prevent an undesirable flow of power (e.g., reverse leakage current) from the system power supply rail to the inoperative wireless power receiver through the first switch. The voltage signal may further be applied to an enable/disable input pin of the wireless power receiver to disable the wireless power receiver. Applying the high voltage level to the enable/disable input pin of the wireless power receiver may result in the wireless power receiver disabling the transmission of power from the associated external wireless power transmitter. Disabling wireless power transmission may result in a reduction of energy dissipation associated with the generation of electromagnetic fields by the wireless transmitter while the wired power supply is operative. Disabling the transmission of power from the wireless power transmitter may be accomplished by sending a signal and/or a message from the wireless power receiver to external wireless power transmitter to disable the wireless power transfer. The signal and/or message may be transmitted using any suitable communication mechanism, such as wireless power communication protocols, Bluetooth communication, and/or the like.

At a process 440, power is conducted from the wired power supply to the system power supply rail through a body diode associated with an open second switch. According to some embodiments, the second switch may include a PFET. The PFET may be held in a non-conductive state during process 440 by applying a gate voltage to the PFET that is within a threshold voltage of the voltage of the system power supply rail. However, the PFET may be associated with a body diode that conducts power from the operative wired power supply to the system power supply rail even when the PFET is in a non-conductive state. Using a body diode to conduct power may allow rapid provisioning of power from the wired power supply to the system power supply rail shortly after the wired power supply becomes operative at process 420.

At a process 450, the second switch is closed and power is conducted between the wired power supply and the system power supply rail through the closed second switch. When the second switch includes a PFET, closing the second switch may include switching PFET from a non-conductive to a conductive state by applying a gate voltage to the PFET that is lower than the voltage of the system voltage rail by at least a threshold voltage of the PFET. According to some embodiments, the gate voltage may be lowered in response to the wireless power receiver being disabled at process 430. When the second switch is closed, at least a portion of the power being conducted from the wired power supply to the system power supply rail through the body diode is conducted through the closed second switch. Conducting power through the closed second switch may be more efficient than conducting power through the body diode, for example, because the closed second switch does not have a diode turn-on voltage that results in a voltage loss.

Figure 5:
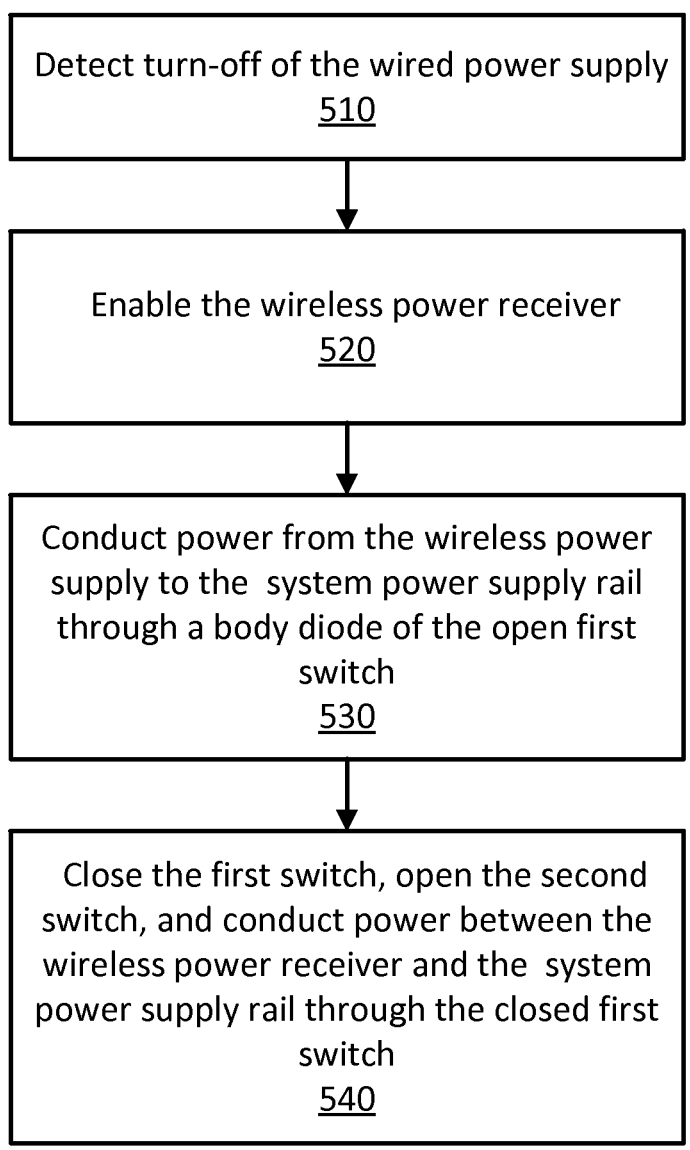
FIG. 5 is a simplified diagram of a method of automatically switching from a wired power supply to a wireless power supply according to some embodiments.

FIG. 5 is a simplified diagram of a method 500 of automatically switching from a wired power supply to a wireless power supply according to some embodiments. According to some embodiments consistent with FIGS. 1-3, method 500 may be performed by an electronic system configured for automatic power supply selection, such as electronic system 100, an electronic device configured for automatic power supply selection, such as electronic device 200, and/or a selection circuit configured for automatic power supply selection, such as selection circuit 300. According to some embodiments consistent with FIG. 4, method 500 may be performed after method 400 is performed.

According to some embodiments, method 500 may be performed when a user unplugs an electronic device that is currently powered over a wire but also is also equipped to receive power wirelessly. Like method 400, the electronic device may be an instance of electronic device 110. The electronic device may include a wireless power receiver, power supply 130 configured as a wireless power receiver, and a wired power supply, such as power supply 140 configured as a wired power supply. The wireless power receiver may be engaged with an external wireless power transmitter, such as external power source 160 configured as a wireless power transmitter. Unplugging the electronic device may include electrically decoupling the wired power supply from an external wired power source, such as external power source 170 configured as a wired power source.

At a process 510, a turn-off of the wired power supply is detected. In some examples, the wired power supply may be turned off by being unplugged from the external power source and/or switched off (manually or otherwise). The wired power supply becomes inoperative (i.e., incapable of supplying power to the electronics module) when it is turned off. According to some embodiments, when the wired power supply is turned off, it may generate an electrical signal, such as a voltage signal, that indicates that it is inoperative. In some examples, the voltage signal may include a transition from a high voltage level to a low voltage level at an output power rail of the wired power supply. According to some embodiments, the voltage signal may be applied across a resistor, capacitor, voltage divider, and/or any other suitable circuit element, thereby allowing the turn-off of the wired power supply to be detected.

At a process 520, the wireless power receiver is enabled. When the wireless power receiver is enabled, it is operative to supply power to the electronics module when coupled to a wireless power transmitter. According to some embodiments, the wireless power receiver is enabled after detecting that the wired power supply is inoperative at process 510 to prevent a scenario where more than one power supply delivers power to the system power supply rail at a given time. In some examples, the wireless power receiver may be enabled based on an electrical signal, such as a voltage signal, sent to the wireless power supply. In some examples, the voltage signal may include a transition from a high voltage level to a low voltage level at an enable/disable input pin of the wireless power supply. Applying the low voltage level to the enable/disable input pin of the wireless power receiver may result in the wireless power receiver enabling the transmission of power from the associated external wireless power transmitter. Disabling wireless power transmission while the wired power supply is turned on and subsequently enabling wireless transmission when the wired power supply is turned off may result in a reduction of energy dissipation associated with the generation of electromagnetic fields by the wireless transmitter while the wired power supply is operative. Enabling the transmission of power from the wireless power transmitter may be accomplished by sending a signal and/or a message from the wireless power receiver to external wireless power transmitter to enable the wireless power transfer. The signal and/or message may be transmitted using any suitable communication mechanism, such as wireless power communication protocols, Bluetooth communication, and/or the like.

At a process 530, power is conducted from the wireless power receiver to the system power supply rail through a body diode associated with an open first switch. As discussed previously with respect to FIG. 4, the first switch may include a PFET. The PFET may be held in a non-conductive state during process 530 by applying a gate voltage to the PFET that is within a threshold voltage of the voltage of the system power supply rail. However, the PFET may be associated with a body diode that conducts power from the operative wireless power receiver to the system power supply rail even when the PFET is in a non-conductive state. Using a body diode to conduct power may allow rapid provisioning of power from the wireless power receiver to the system power supply rail shortly after the wireless power receiver is enabled at process 520.

At a process 540, the first switch is closed, the second switch is opened, and power is conducted between the wireless power receiver and the system power supply rail through the closed first switch. When the first switch includes a PFET, closing the first switch may include switching the PFET from a non-conductive to a conductive state by applying a gate voltage to the PFET that is lower than the voltage of the system voltage rail by at least a threshold voltage of the PFET. According to some embodiments, the gate voltage may be lowered in response to the wired power supply being turned off at process 510. When the first switch is closed, at least a portion of the power being conducted from the wireless power receiver to the system power supply rail through the body diode is conducted through the closed second switch. Conducting power through the closed first switch may be more efficient than conducting power through the body diode, for example, because the closed second switch does not have a diode turn-on voltage that results in a voltage loss. Further during process 540, the second switch is opened in response to the wireless power receiver becoming operative. In some examples, the second switch may be opened based on an electrical signal, such as a voltage signal, sent to the second switch. In some examples, the voltage signal may include a transition from a low voltage level to a high voltage level. As discussed previously with respect to FIG. 4, the second switch may include a PFET. The voltage signal may result in the PFET being switched to a non-conductive state by applying a high gate voltage to the PFET that is within the threshold voltage of the voltage of the system voltage rail. Opening the second switch may prevent an undesirable flow of power (e.g. reverse leakage current) from the system power supply rail to the inoperative wired power supply through the second switch.

As discussed above and further emphasized here, FIGS. 4 and 5 are merely examples which should not unduly limit the scope of the claims. One of ordinary skill in the art would recognize many variations, alternatives, and modifications. According to some embodiments, one or more processes of methods 400 and 500 may be performed concurrently and/or in a different order than depicted. In some examples, processes 420-450 may occur substantially concurrently, e.g., within 1 millisecond of one another. Similarly, processes 510-540 may occur substantially concurrently. According to some embodiments, one or more processes of methods 400 and 500 may be removed and/or additional processes may be added. According to some embodiments, the body diode associated with the first and second switches may include an intrinsic body diode of an FET when the first and second switches are FETs, and/or may include diodes in parallel with the switches such as Schottky diodes.

According to some embodiments, additional methods related to methods 400 and 500 may be performed to automatically select an appropriate power supply in the following use cases: (1) connecting an external power source to an electronic device that is not currently connected to another external power source; (2) disconnecting an external power source from an electronic device that is not currently connected to another external power source; and (3) connecting and/or disconnecting an external wireless power source to/from a device that is currently powered by an external wired power source. In use case (1) the newly connected external power source, whether wired or wireless, may be selected to supply power to the electronic device in the absence of another external power supply. In use case (2), the electronic device may be turned off in the absence of an external power source and/or may switch to a battery power supply. In use case (3), connecting and/or disconnecting the external wireless power source may have little or no effect when the external wired power source is being used, as the wireless power receiver is disabled at the time.

Some examples of controllers, such as control modules 253 and 254 may include non-transient, tangible, machine readable media that include executable code that when run by one or more processors may cause the one or more processors to perform the processes of methods 400 and/or 500. Some common forms of machine readable media that may include the processes of methods 400 and/or 500 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. An electronic system comprising:
   an electronics module;
   a primary power supply that receives power from a primary external power source and supplies the received power to the electronics module when operative;
   a secondary power supply that receives power from a secondary external power source and supplies the received power to the electronics module when operative; and
   a selection module having first and second input rails coupled to the primary and secondary power supplies, respectively, an output rail coupled to the electronics module, a first switch coupled between the first input rail and the output rail, and a second switch coupled between the second input rail and the output rail; wherein:
   when the primary power supply is operative, the selection module selects the primary power supply to supply power to the electronics module and disables the secondary power supply, wherein the first switch is closed and the second switch is open;
   when the primary power supply is not operative and the secondary power supply is operative, the selection module selects the secondary power supply to supply power to the electronics module, wherein the first switch is open and the second switch is closed; and
   when the secondary power supply is disabled, the secondary power supply disables the secondary external power source;
   and wherein when the first or second switch is open, reverse leakage current is blocked from flowing from the output rail towards the input rail corresponding to the open switch.

2. The electronic system of claim 1, further comprising a battery coupled to the electronics module.

3. The electronic system of claim 1, wherein the secondary power supply includes a wireless power receiver and the secondary external power source includes a wireless power transmitter.

4. The electronic system of claim 3, wherein when the secondary power supply is disabled and engaged with the secondary external power source, the wireless power receiver disables the wireless power transmitter.

5. The electronic system of claim 3, wherein the primary power supply is configured to receive power over a wire from the primary external power source.

6. The electronic system of claim 5, wherein the wire is selected from a group consisting of a universal serial bus cable, an Ethernet cable, a dock connector, an alternating current power cord, and a laptop charging cable.

7. The electronic system of claim 1, wherein the first and second switches are each associated with a body diode oriented to allow current flow towards the output rail.

8. The electronic system of claim 1, wherein the selection module further includes:
   a first control module configured to detect when the primary power supply is operative, and when the primary power supply is operative, provide a first control signal to open the second switch and a second control signal to disable the secondary power supply; and
   a second control module configured to detect when the second power supply is operative, and when the second power supply is operative, provide a third control signal to open the first switch.

9. A method comprising:
   conducting power from a wireless power receiver to a system power supply rail through a closed first switch;
   detecting a turn-on of a wired power receiver;
   after detecting the turn-on of the wired power receiver:
   opening the first switch;
      disabling the wireless power receiver, wherein disabling the wireless power receiver includes disabling a wireless power transmitter engaged with the wireless power receiver;
      closing a second switch; and
      conducting power from the wired power supply to the system power supply rail through the closed second switch;
      wherein when the first switch is open, reverse leakage current is blocked from flowing from the system power supply rail towards the power supply corresponding to the first switch; and
   when the second switch is open, reverse leakage current is blocked from flowing from the system power supply rail towards the power supply corresponding to the second switch.

10. The method of claim 9, further comprising:
    detecting a turn-off of the wired power supply;
      after detecting the turn-off of the wired power supply:
      enabling the wireless power receiver, wherein enabling the wireless power receiver includes enabling the wireless power transmitter;
      closing the first switch;
      opening the second switch;
         conducting power from a wireless power supply to a system power supply rail through the closed first switch.

* * * * *